United States Patent
Santra et al.

(10) Patent No.: US 10,554,312 B2
(45) Date of Patent: Feb. 4, 2020

(54) METHOD AND SYSTEM FOR MEASURING INTERFEROMETRIC VISIBILITY OF TELESCOPIC SIGNALS HAVING IMPERFECT QUANTUM ENTANGLEMENT

(71) Applicant: U.S. Army Research Laboratory, Adelphi, MD (US)

(72) Inventors: Siddhartha Santra, Hyattsville, MD (US); Brian T. Kirby, Baltimore, MD (US); Vladimir S. Malinovsky, Clifton, NJ (US); Michael Brodsky, Millburn, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 24 days.

(21) Appl. No.: 15/979,020

(22) Filed: May 14, 2018

(65) Prior Publication Data
US 2019/0349094 A1   Nov. 14, 2019

(51) Int. Cl.
*H04B 10/70* (2013.01)
*G02B 23/04* (2006.01)
*G06F 17/16* (2006.01)
*G06F 17/15* (2006.01)
*G06F 17/14* (2006.01)

(52) U.S. Cl.
CPC ............ *H04B 10/70* (2013.01); *G02B 23/04* (2013.01); *G06F 17/15* (2013.01); *G06F 17/16* (2013.01); *G06F 17/14* (2013.01)

(58) Field of Classification Search
CPC ......... G02B 23/00; G02B 23/04; G06F 17/14; G06F 17/15; G06F 17/16; H04B 10/70
See application file for complete search history.

(56) References Cited

U.S. PATENT DOCUMENTS

| | | | |
|---|---|---|---|
| 7,079,259 B1* | 7/2006 | Stenton | G01B 11/272 356/152.2 |
| 9,267,782 B1* | 2/2016 | Capron | G01B 9/02041 |
| 9,727,959 B2* | 8/2017 | Meyers | G06T 5/007 |
| 2014/0146323 A1* | 5/2014 | Capron | G02B 27/58 356/450 |
| 2017/0082494 A1* | 3/2017 | Hughes | G01J 4/04 |

OTHER PUBLICATIONS

Zhu, Yunhui et al. "Aberration-corrected quantum temporal imaging system". Phys. Rev. A, 87, 043808, Apr. 8, 2013. (Year: 2013).*

(Continued)

*Primary Examiner* — Michael A Lyons
(74) *Attorney, Agent, or Firm* — Eric B. Compton (57) ABSTRACT

Methods and systems for measuring interferometric visibility of telescopic signals using resources having imperfect quantum entanglement are disclosed. The novel methodology employed by embodiments of the present invention takes into account the difficulty in creating entanglement between distance telescopes, and describes how to incorporate problems associated with distributing quantum entanglement into the measurement procedure. This allows the distance that two telescopes in an optical array are spaced apart to be increased while still interacting.

16 Claims, 5 Drawing Sheets

(56) References Cited

OTHER PUBLICATIONS

Altepeter, J. B., Jeffrey, E. R., & Kwiat, P. G., "Photonic State Tomography," Advances in Atomic, Molecular and Optical Physics, vol. 52, pp. 105-159 (2005), DOI: 10.1016/S1049-250X(05)52003-2.
C. Simon et al., "Quantum memories: A review based on the European integrated project Qubit Applications (QAP)," Eur. Phys. J. D 58, 1-22 (2010).
D. Gottesman, T. Jennewein, and S. Croke, "Longer-Baseline Telescopes Using Quantum Repeaters," Phys. Rev. Lett. 109, 070503 (2012).
J. Yin et al., "Satellite-based entanglement distribution over 1200 kilometers," Science 356, 1140-1144 (2017).
Siddhartha Santra, Brian T. Kirby, Vladimir S. Malinovsky, and Michael Brodsky, "Entanglement enabled telescopic arrays in the presence of decoherence," submitted to Quantum Physics on May 15, 2017 and posted for review at https://arxiv.org/abs/1705.05389.
Sarah Kaplan, "Quantum entanglement, science's 'spookiest' phenomenon, achieved in space," The Washington Post. Jun. 15, 2017.
Navy Precision Optical Interferometer, https://lowell.edu/research/research-facilities/npoi/ copyright 2018. [Accessed May 7, 2018].
Navy Precision Optical Interferometer (Welcome home page), http://www2.lowell.edu/rsch/npoi/index.php [Accessed May 7, 2018].
United States Naval Observatory Flagstaff Station, http://www.nofs.navy.mil/ Website states: Last updated: Apr. 2, 2015. [Accessed May 7, 2018].

* cited by examiner

FIG. 1A
(Background)

FIG. 1B
(Background)

FIG. 2
(Background)

FIG. 3

ENTANGLEMENT DISTRIBUTION SYSTEM (EDS)

FIG. 3A

METHOD FOR OBTAINING THE VISIBILITY OF TELESCOPIC SIGNALS BY MEASURING QUANTUM CORRELATION FUNCTION - 400

410. For two different phase delay settings δ1, δ2 for entangled photons received by the individual telescopes of the pair, measure the degree of quantum correlation $E(\delta)$ between the telescopes; and 420. Determine the interferometric visibility $V$ based on the quantum correlation measurements $E(\delta 1)$, $E(\delta 2)$ for the two different phase delay settings δ1, δ2.

FIG. 4A

MEASURE THE DEGREE OF QUANTUM CORRELATION $E(\delta)$ BETWEEN THE TELESCOPES – 410

411. Maintain logs $Nij$ for each of the four photon detectors $L_1$, $L_2$, $R_1$, $R_2$;

412. Initialize the count logs (i.e., set them to zero);

413. Over an observation period (e.g., about 1-100 ms), count the number of photon detection events that occur at each of the four photon detectors;

414. Determine correlated counts, anti-correlated counts, and those of which are neither correlated nor anti-correlated for the two individual telescopes; and 415. Calculate the degree of quantum correlation of photons received by the two individual telescopes from the determined counts according to:

$$E(\delta) = (N_{11}+N_{22}-N_{12}-N_{21})/(N_{11}+N_{22}+N_{12}+N_{21}),$$

where $Nij$ is count log for a given photon detector $ij$.

FIG. 4B

DETERMINE THE INTERFEROMETRIC VISIBILITY $V$ BASED ON THE QUANTUM CORRELATION MEASUREMENTS $E(\delta 1)$, $E(\delta 2)$ - 420

421. Calculate the phase $V_p$ of the interferometric visibility $V$ according to:
$$V_p = tan^{-1}[\frac{1}{\sin \delta 2}(\frac{\sin(\delta 2 - \delta 1)}{\alpha \sin \delta 2 - \sin \delta 1} - \cos \delta 2)], \text{ where } \alpha = E(\delta 1)/E(\delta 2);$$

422. Calculate the amplitude $V_a$ of the interferometric visibility $V$ according to:
$$V_a = \frac{E(\delta 1)}{C \cos(V_p - \delta 1)}, \text{ where } C = \frac{2|\rho_{23}|}{\rho_{22} + \rho_{33}} \text{ ; and}$$

423. The resulting interferometric visibility $V$ is given by
$$V = V_a \exp(-i V_p),$$

where $\delta 1$ and $\delta 2$ are the two different phase delay settings, respectively, $E(\delta 1)$ and $E(\delta 2)$ are the measured degree of quantum correlation of photons received by the two individual telescopes at $\delta 1$ and $\delta 2$, respective, and $\rho$ is a state density matrix that characterizes the entanglement distribution system.

FIG. 4C

THE STATE DENSITY MATRIX $\rho$ $$\rho_0 = \begin{bmatrix} \rho11 & \rho12 & \rho13 & \rho14 \\ \rho21 & \rho22 & \rho23 & \rho24 \\ \rho31 & \rho32 & \rho33 & \rho34 \\ \rho41 & \rho42 & \rho43 & \rho44 \end{bmatrix}$$

FIG. 5(a)

$$\rho_1 = \begin{bmatrix} \rho11 & 0 & 0 & \rho14 \\ 0 & \rho22 & \rho23 & 0 \\ 0 & \rho32 & \rho33 & 0 \\ \rho41 & 0 & 0 & \rho44 \end{bmatrix}$$

FIG. 5(b)

$$\rho_2 = \begin{bmatrix} \rho11 & 0 & 0 & \rho14 \\ 0 & \rho22 & \rho_{23} & 0 \\ 0 & \rho_{23}^* & \rho33 & 0 \\ \rho_{14}^* & 0 & 0 & \rho44 \end{bmatrix}$$

FIG. 5(c)

$$\rho_{ideal} = \frac{1}{2} \begin{bmatrix} 0 & 0 & 0 & 0 \\ 0 & 1 & 1 & 0 \\ 0 & 1 & 1 & 0 \\ 0 & 0 & 0 & 0 \end{bmatrix}$$

FIG. 5(d)

$$\rho_E = \frac{1}{2} \begin{bmatrix} 0 & 0 & 0 & 0 \\ 0 & 1 & e^{-i\delta} & 0 \\ 0 & e^{i\delta} & 1 & 0 \\ 0 & 0 & 0 & 0 \end{bmatrix}$$

FIG. 5(e)
(*Prior Art*)

METHOD AND SYSTEM FOR MEASURING INTERFEROMETRIC VISIBILITY OF TELESCOPIC SIGNALS HAVING IMPERFECT QUANTUM ENTANGLEMENT

GOVERNMENT INTEREST

The embodiments of the present invention disclosed herein may be manufactured, used, and/or licensed by or for the United States Government without the payment of royalties thereon.

FIELD

This invention generally relates to quantum-interferometric telescopy, and more particularly, to methods and systems for measuring interferometric visibility of telescopic signals using resources having imperfect quantum entanglement. These methods and systems may be beneficial to the fields of astronomy, space science, imaging and sensing, for instance.

BACKGROUND OF THE INVENTION

The angular resolution of telescopic arrays used in direct-detection interferometric measurement can be enhanced by increasing the baseline size, i.e., the distance between telescopes. The telescopes are used to observe the interference pattern of light coming from the source, with the latter providing information about the correlation function of the radiation from distant objects, such as stars and other astronomical objects, for example. Experimentally, the interference pattern is used to measure the amplitude and phase of the complex visibility function from which the source intensity distribution can then be calculated. Increasing the baseline of the telescope array for visibility measurements while maintaining sensitivity can improve the resolution of the source intensity distribution. However, one problem with the direct-detection interferometric method is the loss of photons during transmission between the telescopes in an array. Longer baselines lead to higher photon loss resulting in lower rates of successful interference events, which reduces the scheme sensitivity. Thus, an increase in resolution is generally accompanied by a loss in sensitivity of interferometric measurements using telescopic arrays.

A way to mitigate this problem using mode-entangled photons has been proposed in D. Gottesman, T. Jennewein, and S. Croke, "Longer-Baseline Telescopes Using Quantum Repeaters," Phys. Rev. Lett. 109, 070503 (2012), herein incorporated by reference in its entirety. Their main idea was to distribute known and replaceable photons in a perfect Bell-state between two telescopes in advance, utilizing a quantum network, and extract the visibility function from local measurements, therefore eliminating the propagation loss of the collected photons. However, technologically it is infeasible to reliably distribute perfectly entangled quantum states over long distances. This is because the enabling technology of long-lifetime quantum memories, decoherence-free entanglement swapping mechanisms, high-fidelity quantum gates for purification, distillation and error-correcting protocols is not mature enough to yield distributed states with fidelities close to perfectly-entangled Bell-states.

SUMMARY OF INVENTION

According to embodiments of the present invention, novel methods and systems for determining interferometric visibility of signals received from a telescope system aided by quantum entanglement are disclosed. The quantum entanglement between the telescopes is presumed to be imperfect which better reflects the reality of actual interferometric telescope systems employing quantum entanglement.

The telescope system aided by quantum entanglement may be comprised of, among other things: a pair of telescopes spaced apart; a first beamsplitter connected to the first of the pair of telescopes which splits light to a first pair of photon detectors; a second beamsplitter connected to the second of the pair of telescopes which splits light to a second pair of photon detectors; an entanglement distribution system connected to the first and second beamsplitters which generates entangled photons and transmits respective ones of the entangled photons to each of the first and second beamsplitters; and a phase modulator connected to the entanglement distribution system which is configured to set the phase delay for light transmitted between the first and second beamsplitters via the entanglement distribution system.

In some implementations, the telescopes may be spaced about 300-400 m apart as are the three current state-of-the art telescope arrays in the United States at Mount Wilson, Calif., Magdalena Ridge, N. Mex. and Anderson Mesa, Ark. Although, the embodiments disclosed herein should permit telescopes to be spaced about 1,000 km or more apart. This represents an increased resolution of three orders of magnitude or more.

The novel methodology works for all parts of the optical spectra (e.g., infrared, visible, and ultraviolet), although, it may be most effective for the visible and near-visible part of the spectrum. It may also be beneficial for applications that require high resolution imaging especially in low light condition and include sensing, communication, and imaging. Additionally, the novel methodology of the present invention is believed to work with all optical telescopes. They can be conventional optical designs, e.g., refractor, reflector, or catadioptric. Each of telescopes may have a diameter of 1 m or greater.

According to an embodiment, the entanglement distribution system may be comprised of, among other things: a single photon source, a beam splitter, a frequency conversion device, a source-fiber optical couplers, optical fibers, and quantum memories. The phase delay setting level is set by adjusting the phase modulator operatively included within or connected to the entanglement distribution system.

The novel methods according to embodiments of the present invention generally include the following steps. For two different phase delay settings for entangled photons received by the individual telescopes of the pair, the degree of quantum correlation between the telescopes is measured. Next, the interferometric visibility based on the quantum correlation measurements for the two different phase delay settings is determined.

The two different phase delay settings are selected such that a difference D between them is $0<D<\pi$ radians. They may be arbitrarily chosen so long as different. The value of each phase delay setting is between 0 and $2\pi$ radians.

The step of measuring the degree of quantum correlation between the telescope may include steps of: maintaining count logs for each of the four photon detectors of the first pair and second pair of photon detectors; initializing the count logs; over an observation period, counting the number of photon detection events that occur at each of the four photon detectors; determining correlated counts, anti-correlated counts, and those of which are neither correlated nor anti-correlated for the two individual telescopes; and calculating the degree of quantum correlation of photons received by the two individual telescopes from the determined counts. The observation period may be about 1-1,000 ms, for instance. The degree of quantum correlation E is calculated according to: $E=(N_{11}+N_{22}-N_{12}-N_{21})/(N_{11}+N_{22}+N_{12}+N_{21})$, where $N_{ij}$ is count log for a given photon detector ij.

More particularly, the interferometric visibility Vis given according to: $V=V_a \exp(-i V_p)$, where $V_a$ is the amplitude and $V_p$ is the phase thereof. The step of determining the interferometric visibility based on the quantum correlation measurements for the two different phase delay settings further comprises: calculating the phase $V_p$ of the interferometric visibility V according to:

$$V_p = \tan^{-1}\left[\frac{1}{\sin\delta 2}\left(\frac{\sin(\delta 2 - \delta 1)}{\alpha\sin\delta 2 - \sin\delta 1} - \cos\delta 2\right)\right],$$

where $\alpha=E(\delta 1)/E(\delta 2)$; and calculating the amplitude $V_a$ of the interferometric visibility V according to:

$$V_a = \frac{E(\delta 1)}{C\cos(V_p - \delta 1)},$$

where $$C = \frac{2|\rho_{23}|}{\rho_{22} + \rho_{33}}.$$

Here, $\delta 1$ and $\delta 2$ are the two different phase delay settings, respectively, $E(\delta 1)$ and $E(\delta 2)$ are the measured degree of quantum correlation of photons received by the two individual telescopes at $\delta 1$ and $\delta 2$, respective, and ρ is a state density matrix that characterizes the entanglement distribution system. The state density matrix ρ may be expressed according to:

$$\rho = \begin{bmatrix} \rho 11 & 0 & 0 & \rho 14 \\ 0 & \rho 22 & \rho 23 & 0 \\ 0 & \rho_{23}^* & \rho 33 & 0 \\ \rho_{14}^* & 0 & 0 & \rho 44 \end{bmatrix}.$$

The values within the state density matrix ρ can be determined experimentally by performing tomography experiment procedures on the telescope system.

Once the interferometric visibility is determined, an image of a target can be created by interfering light that each telescope individually captures aided by the quantum entanglement and the determined interferometric visibility by integrating the determined interferometric visibility.

According to further embodiments, the telescope system may include a suitable controller to execute machine-executable instructions. It may be configured to execute ordinary machine-executable instructions to control and operate the entangled photon distribution system for the telescopes in a conventional manner. Not only for ordinary control, but the controller may be further configured to execute machine-executable instructions to implement embodiments of the novel methodology for determining interferometric visibility of signals received from a telescope system aided by quantum entanglement.

These and other embodiments will be described in further detail below with respect to the following figures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

FIGS. 5(a)-5(e) show various state density matrices.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION OF EMBODIMENTS

The inventors describe a novel methodology for measuring interferometric visibility function using imperfectly entangled states shared between telescopes. It is embodied in the various methods and systems disclosed herein.

Aspects of this invention have been previously disclosed by the inventors in the following paper herein incorporated by reference in its entirety: Siddhartha Santra, Brian T. Kirby, Vladimir S. Malinovsky, and Michael Brodsky, "Entanglement enabled telescopic arrays in the presence of decoherence," submitted to Quantum Physics on 15 May 2017 and posted for review at http://arxiv.org/abs/1705.05389. In this paper, the inventors proposed a protocol of measuring interferometric visibility function using imperfectly entangled states shared between remote telescopes. Moreover, the inventors showed how errors in visibility measurement, and in turn, errors in intensity distribution of a distant object depend on the degree of entanglement of the shared quantum resource. They determined that these errors are sufficiently small over a wide range of resource states which makes the novel technique feasible in practical environments and with technology realizable in the near future.

The present invention builds upon this initial research. Specifically, the novel methodology in embodiments of the present invention involves measuring cross correlation between two electric fields at remote locations by using a quantum resource, when the resource is partially degraded and imperfect.

This novel methodology relies on quantum entanglement, which is operationally manifested as measured correlations between particles of light. This quantum entanglement is used to mediate interactions between the distant telescopes and results in an increased imaging resolution while reducing the loss of sensitivity. It allows for the imaging of faint distant sources to a resolution at sensitivities which was not previously possible. This enhanced resolution could be used to resolve previously unresolvable features of signals emitted from both land based sources such as buildings, vehicles, or persons, as well flying objects such as planes or satellites. The novel methodology also allows for increasing the distance that two or more telescopes in an optical array can be placed from one another while still interacting. Increasing the distance between two telescopes in an optical array permits increasing the resolution of received images especially in low light conditions.

The novel methodology employed by embodiments of the present invention takes into account the difficulty in creating entanglement between distance telescopes, and describes how to incorporate problems associated with distributing quantum entanglement into the measurement procedure.

Understanding Interferometric Telescopy.

Telescope arrays create images of distant sources by interfering together the light that each telescope individual captures. In order to create a high resolution image of a source, a telescope array needs to perform this interference between signals from the different telescopes for every possible distance that two telescopes can be from one another.

Interferometric measurements allows phase information of radiation collected from spatially separated points of a target to be extracted. This phase information can be used to distinguish the angular positions of different points at the source from which the radiation emerges, resulting in the resolution of different source points. The essential idea of direct interferometry can be understood through Young's double slit experiment.

Figure 1A:
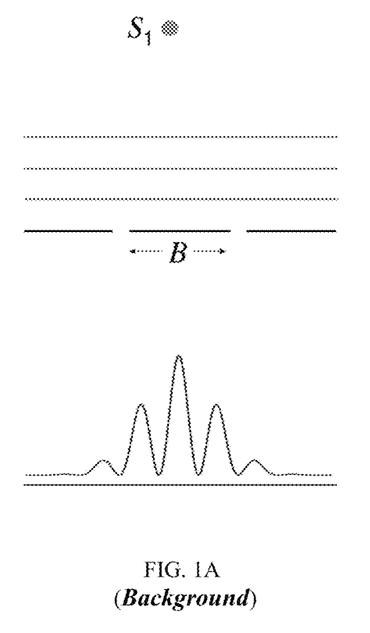
FIG. 1A shows monochromatic plane waves of light from a distant source passing through two slits.
Figure 1B:
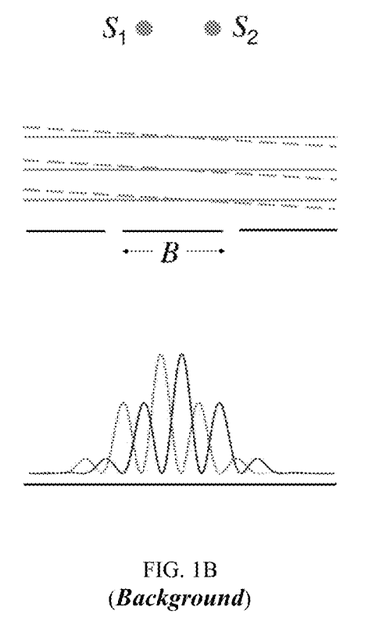
FIG. 1B shows how two nearby sources produce two sets of overlapping interference patterns on the screen.

FIG. 1A shows monochromatic plane waves of light from a distant source $S_1$ pass through two slits separated by a distance B. Constructive and destructive interference of the waves from the slits result in a pattern of alternating bright and dark fringes on a screen. The distance between screens is negligible compared to the distance to the source. In FIG. 1B, similarly, two nearby sources $S_1$ and $S_2$ produce two sets of overlapping interference patterns on the screen. Two point-sources are resolved if the central maximum of the interference pattern from one source coincides with the first minimum of the interference pattern from the other. When this happens, the angular separation of the two-point sources (resolution) is defined as $$\Delta\Theta = \lambda/2B \quad (1)$$

where $\lambda$ is the wavelength of the monochromatic light, and B the separation between the slits. To determine the size of an extended source, the intensity distribution of the source as a function of the observation angle is measured. Usually, such sources are considered as multiple independent point-sources which produce correspondingly many overlapping fringe patterns in the interferometric measurement. The Van Cittert-Zernike theorem relates the contrast of the fringe pattern for an extended source, also called the visibility, to the Fourier transform of the source intensity distribution.

Figure 2:
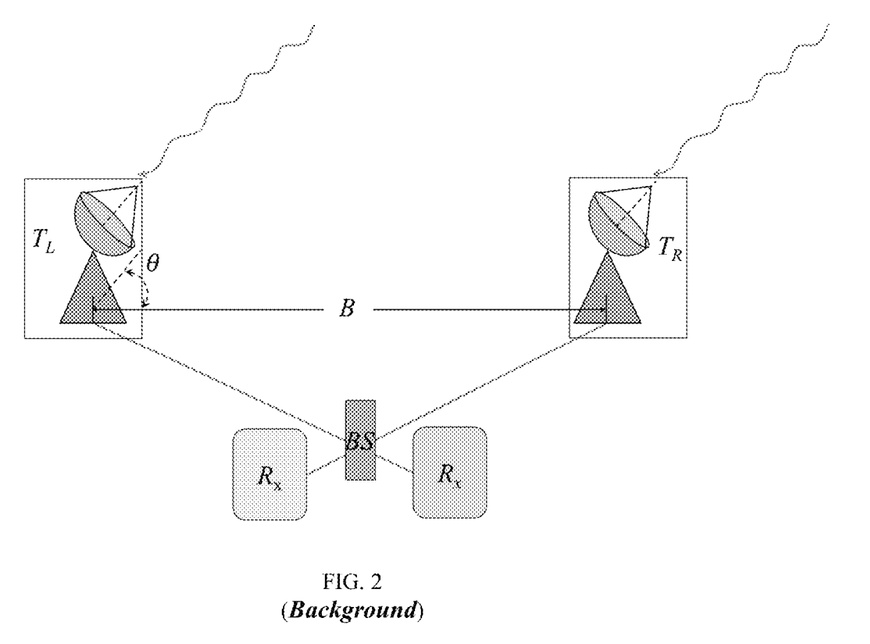
FIG. 2 is a schematic of a conventional direct interferometry telescope system.

The direct interferometry approach has been conventionally utilized to increase the resolution of telescope arrays. FIG. 2 is a schematic of a direct interferometry telescope system having a pair of telescopes $T_L$ and $T_R$ separated by a distance of magnitude B that collects photons originating from a distant target. The collected photons have a phase difference proportional to the geometrical path difference given by $\Delta\phi = B \cos(\theta)/\lambda$. Initially, the baseline B and the observation angle $\theta$ are set to certain values. The optical fields received by telescope $T_L$ and $T_R$ are interfered at the beamsplitter BS and recorded at two receivers Rx. The visibility $V = \langle E1, E2 \rangle$ for B and $\theta$ is obtained. E1 and E2 here are the electric fields amplitudes at the right and left telescopes, respectively. Stepping through a range of B and $\theta$, these steps are repeated for each setting thus building the visibility V as a spatial function. The angular intensity distribution is obtained from this as an inverse Fourier transform of the visibility spatial function.

The angular resolution of telescopic arrays used in direct-detection interferometric measurements can be enhanced by increasing the baseline size, i.e., the distance between telescopes. The observed interference pattern contains information about the correlation function of the radiation from an astronomical object and allows the extraction of information about the amplitude and phase of the complex visibility function, often called the fringe parameter, mutual intensity, or mutual coherence function. Increasing the baseline of the telescope array while maintaining sensitivity can improve the resolution of the source intensity distribution. However, one problem with the direct-detection interferometric method is the loss of photons during transmission between the telescopes in an array. Longer baselines lead to higher photon loss resulting in lower rates of successful interference events, which in turn reduces the scheme sensitivity.

Thus, quantum-enhanced interferometry with ideal, albeit technologically infeasible resources has been proposed recently in the aforementioned Gottesman et al. paper. The essential idea of quantum-enhanced interferometry is to remove the need for actual physical transport of the collected photons from the separated telescopes to the measurement station. Instead, correlations between local measurements (at the telescope locations) on the collected photons from the astronomic object and an entangled pre-shared photons are used to obtain the visibility function.

Figure 3:
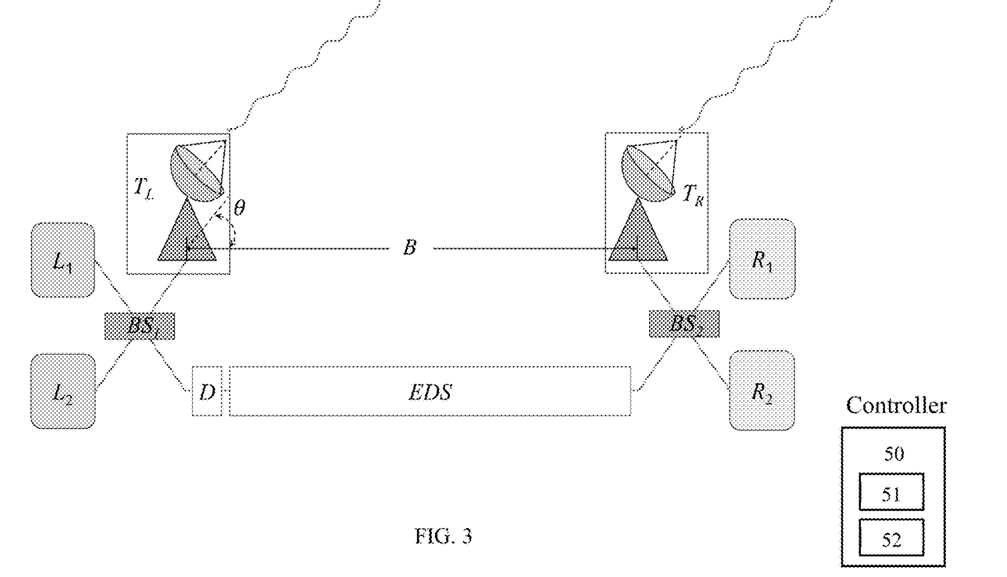
FIG. 3 shows an interferometric telescope system having imperfect quantum entanglement used in an embodiment of the present invention.

FIG. 3 shows an exemplary embodiment of an interferometric telescope system which utilizing quantum entanglement. Using quantum-enhanced interferometry, the pair of telescopes $T_L$ and $T_R$ is separated by a baseline distance of magnitude B. Four single photon detectors $L_1$, $L_2$, $R_1$, and $R_2$ are used for detecting and recording photons. Two beamsplitters and an entanglement distribution system EDS connect the left telescope $T_L$ and the right telescope $T_R$ and function so that the telescopes share an entangled state. The first beamsplitter $BS_1$ connects to the first left telescope $T_L$ and splits light to a first pair of photon detectors $L_1$ and $L_2$. Similarly, a second beamsplitter $BS_2$ connects to the second of the the right telescope $T_R$ which splits light to a second pair of photon detectors $R_1$ and $R_2$. Beam-splitters $BS_1$ and $BS_2$ may each be 50:50 beam-splitters, for instance.

The entanglement distribution system (EDS) connects to the first beamsplitter $BS_1$ and the second beamsplitter $BS_2$ which generates entangled photons and transmits respective ones of the entangled photons to each of the first and second beamsplitters $BS_1$ and $BS_2$. Correlations between outcomes of local measurements performed on the incoming single photon from the target and the entangled photon supplied by the quantum network yield the desired interferometric information, i.e., visibility function.

Figure 3A:
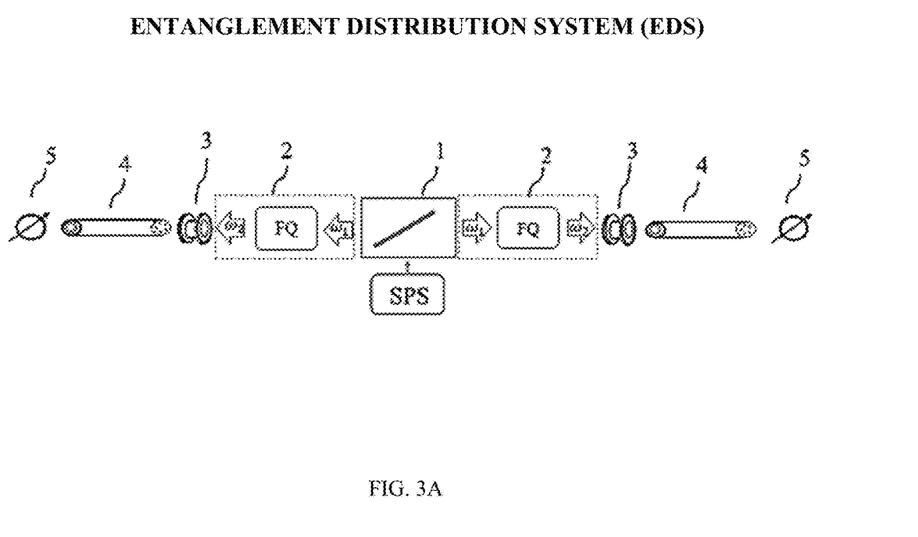
FIG. 3A is schematic of one embodiment for the entanglement distribution system that may be in the telescope system.

FIG. 3A is schematic of one embodiment for the entanglement distribution system (EDS) which may be included in the system depicted in FIG. 3 showing its components in more detail. The EDS shown is generally comprised of a single photon source SPS, a beam splitter 1, a frequency conversion device 2, source-fiber optical couplers 3, optical fibers 4, and quantum memories 5. The SPS may be a laser, for instance, which emits pulses of light (photons) used to generate the entangled photons. The beam splitter 1 may be a 50:50 beam splitter, splitting a single photon into a coherent quantum superposition of two paths and ultimately to the two telescopes. The single photon source SPS and the beam-splitters $BS_1$ and $BS_2$ create spatial mode-entangled Bell-pairs which are transmitted along two paths to the telescopes $T_L$ and $T_R$ via a quantum network. Depending on the total length of the quantum network, various means of entanglement distribution, e.g. quantum repeaters, can be used.

The frequency conversion device 2 changes the input frequency on of the light from the SPS to an output frequency $\omega_2$. Frequency conversion may be employed to change the frequency of the entangled photon to frequencies best suited for transmission through optical fibers and vice-versa. Such conversion devices are known in the art. Optical fibers 4 may be coupled with the optical couplers 3 so as to prevent optical losses. A pair of quantum memories 5 is used in the entanglement distribution system (EDS). One memory is located at each of the two telescope sites which is used to store the shared entangled state that the EDS produces and distributes to the two telescopes. An example of a quantum memory 5 which may be used is disclosed in C. Simon et al., "Quantum memories: A review based on the European integrated project "Qubit Applications (QAP)," Eur. Phys. J. D 58, 1-22 (2010), herein incorporation by reference in its entirety.

In other embodiments, polarization-entangled photons can also be used as a resource to increase the telescope baseline. Control and manipulation of the polarization can provide a way to obtain single photon spatial-mode entangled photons that match the spatio-temporal mode of the incoming astronomical photons.

A controllable phase difference $\delta$ can be introduced between the left and the right paths of the EDS. A phase modulator connected to the entanglement distribution system which is configured to set the phase delay for light transmitted between the first and second beamsplitters via the eentanglement distribution system. For instance, the phase delay $\delta$ can be set by using a commercial phase modulator in which applied electrical signal is converted into optical phase delay $\delta$. The value of phase delay is between 0 and $2\pi$ radians. The phase modulator is shown to the left of the entanglement distribution system in FIG. 3. This implementation is non-limiting. The phase modulator could be alternatively located to the right of the EDS, or even within a path of the EDS, in other implementations.

Gottesman et al., mentioned above, first contemplated a system similar to this, but made different assumptions regarding, and calculations for determining, the interferometric visibility. The novel methodology of the embodiments of present invention uses different assumptions and calculations for determining, the interferometric visibility. The most important distinction being that in embodiments of the present invention the resource quantum state is assumed imperfectly entangled.

Before turning to the novel methodology of the inventors, the state of the art method for measuring the quantum correlation function E of the telescopes is briefly summarized as follows. First, the entanglement distribution system (EDS) is set to distribute entangled modes to reach two beamsplitters $BS_1$ and $BS_2$ simultaneously. The four detectors: $L_1$, $L_2$, $R_1$, and $R_2$ are initialized for counting coincidence, and then coincidental events $(L_1, R_1)$, $(L_2, R_2)$, $(L_1, R_2)$, $(L_2, R_1)$ are recorded. Events $(L_i, R_j)$ are simultaneous detections by two detectors only with each located at different telescopes, and with no other detection occurring at the other two remaining detectors. A sufficient number of counts $N_{ij}$ are collected for each event $(L_i, R_j)$, where i,j=1,2. The quantum correlation function according to: $E=(N_{11}+N_{22}-N_{12}-N_{21})/(N_{11}+N_{22}+N_{12}+N_{21})$.

The idealized scheme based on perfect Bell-states shared between the telescope sites is summarized in what follows. Gottesman et al., mentioned above, considered weak light from a distant astronomical object (denoted by the subscript A) at the single-photon level which is characterized by a mode-entangled wave-function:

$$|\psi\rangle_A = \frac{1}{\sqrt{2}}(|0\rangle_L|1\rangle_R + e^{-i\Delta\phi}|1\rangle_L|0\rangle_R), \qquad (2)$$

where L, R denote the left and right telescopes, respectively.

Such astronomical single photons are rare, thus losses and noise incurred during the physical transmission process between the telescopes reduce the effective signal quality. Use of shared entangled states was proposed to overcome this problem of the signal degradation. A known perfectly-entangled photonic state is established between the telescope sites, in advance, before local joint-measurements on the astronomical photon and the network supplied photon are performed. It turns out that the correlations between these local measurements yield the same information of the visibility function as do direct interferometric measurements on the astronomical photons physically transmitted to the central detection station.

Various decoherence mechanisms in the quantum network lead to imperfectly entangled states, including those due to lossy fibers leading to photon losses, and imprecision and imperfections in the various connecting elements, quantum gates, filters, memories, etc. among other things. The left and right arms of the EDS network are susceptible to independent channels of decoherence leading to shared entangled two-qubit states of the X-form. Here, two-qubit refers to the 4-dimensional Hilbert space of a two-mode entangled single photon state.

Determining the interferometric visibility according to embodiments of the present invention.

The novel methodology, which specifically takes into account imperfect, hence, technologically feasible resources, can mitigate photon loss and provide better resolution when compared to other interferometric measurement methods, such as intensity interferometry based on the Hanbury Brown Twiss effect and heterodyne interferometry. It yields both the amplitude and phase of the visibility function whereas intensity interferometry usually loses the phase information. With respect to heterodyne interferometry the quantum enhanced direct-detection scheme can have a better signal-to-noise ratio in the optical regime where the former is limited by quantum noise. The entanglement of the resource-state correlates the noise in the measurement outcomes at different telescopes which gets cancelled by considering their correlation or anti-correlation. The methodology of the present invention can be implemented using high-throughput quantum-networks that can generate mode-entangled single photons over a wide range of wavelengths to maximize the fraction of incoming photons successfully detected.

More particularly, the inventors measure the complex visibility function utilizing quantum X-states which could feasibly be distributed across the nodes of a quantum network with currently available technology. The X-state form of the density matrix is general enough to take into account decoherence and photon loss in the distribution process between a perfect Bell-pair source and two telescope sites. Such decoherence and photon loss can occur, for instance, with amplitude-damping, dephasing and depolarization in the entanglement distribution process. In the inventors' aforementioned Quantum Physics paper, they examined the effects of these occurrences, and calculated the dependence of the measurement rate and visibility on the resource state matrix elements. They found that the results of the visibility measurements are determined by the concurrence and the sum of diagonal density matrix elements (weight) of the X-state in the mode-entangled subspace. And they showed that the error in the visibility magnitude is inversely proportional to the product of the concurrence and the square-root of the weight, while the error in the visibility phase is inversely proportional to the square-root of the weight of the X-state. Using entangled X-states, the visibility function can be obtained from local measurements of the probability for correlated and anti-correlated photon detections at the telescope sites.

Figure 4A:
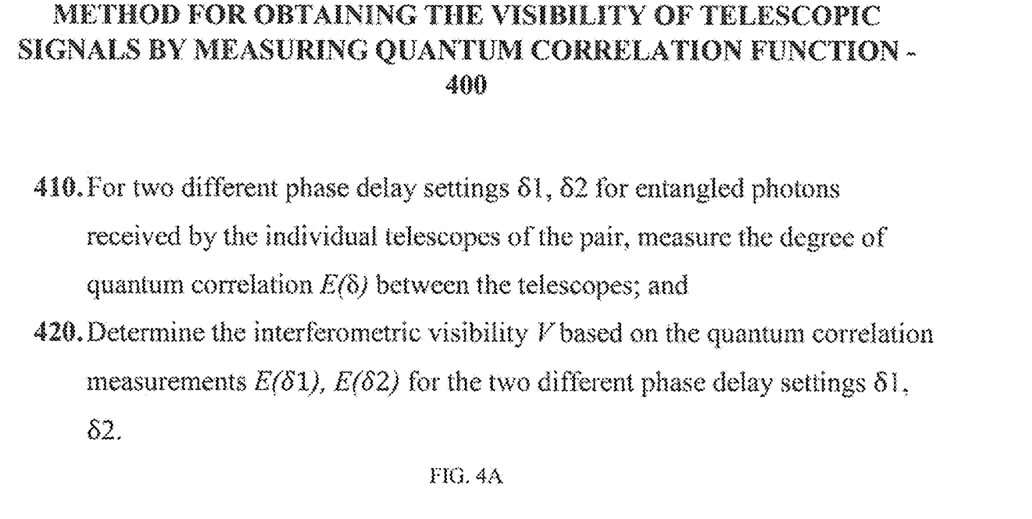
FIG. 4A shows a method for measuring interferometric visibility of telescopic signals with imperfect quantum entanglement according to embodiments of the present invention.

FIG. 4A shows a method 400 for measuring interferometric visibility of telescopic signals with imperfect quantum entanglement according to embodiments of the present invention. In step 410, for two different phase delay settings $\delta 1$, $\delta 2$ for entangled photons received by the individual telescopes of the pair, the degree of quantum correlation $E(\delta)$ is measured there between. As mentioned above, the phase delay $\delta$ can be set by using a commercial phase modulator, for instance, in which applied electrical signal is converted into optical phase delay $\delta$. The value of phase delay setting $\delta$ is between 0 and $\pi$ radians. The particular values $\delta 1$ and $\delta 2$ may be arbitrarily chosen so long as different. The two different phase delay setting $\delta 1$, $\delta 2$ are selected such that a difference D between them is $0 < D < \pi$ radians. Next in step 420, the interferometric visibility V based is determined on the basis of the quantum correlation measurements $E(\delta 1)$, $E(\delta 2)$ for the two different phase delay settings $\delta 1$, $\delta 2$. Here, mathematical processing can be used for computing the amplitude $V_a$ and phase $V_p$ components of the interferometric visibility V. These computations use the phase delay setting $\delta 1$ and $\delta 2$, the measured degree of quantum correlation of photons $E(\delta 1)$ and $E(\delta 2)$, and particular values of the state density matrix $\rho$ that characterize the entanglement distribution system.

The subroutines of steps 410 and 420 of method 400 are further detailed below with respect to FIG. 4B and FIG. 4C, respectively.

Figure 4B:
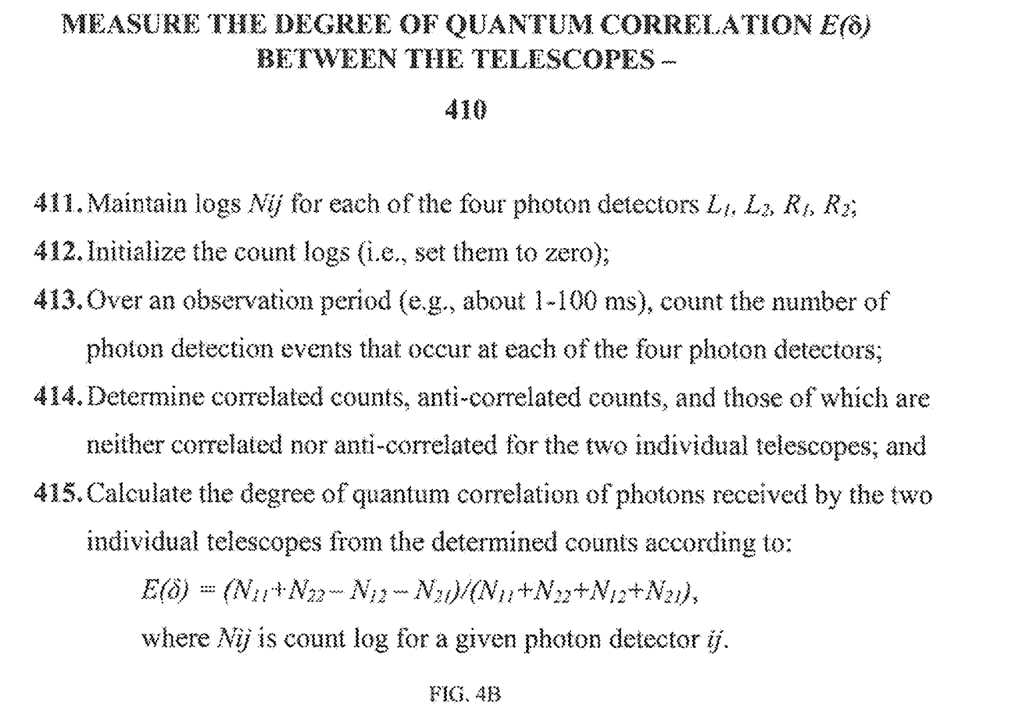
FIG. 4B shows a subroutine of the method for measuring the degree of quantum correlation between the telescopes.

FIG. 4B shows the subroutine 410 for how to measure the degree of quantum correlation $E(\delta)$ between the telescopes in greater detail according to embodiments of the present invention.

The quantum correlation E is calculated based on four different coincidence detection counts of the four single photon detectors $L_1$, $L_2$, $R_1$, and $R_2$. To aid in counting, at the two telescope sites, one maintains count logs of four detector clicks and the times at which the detectors click. (Step 411). The count logs for the four detectors $L_1$, $L_2$, $R_1$, $R_2$ are identified as $N_{L1}$, $N_{L2}$, $N_{R1}$, and $N_{R2}$ (or more generically, Nij for a given photon detector ij). The count logs may be implemented with an analog or digital memory. Before starting of counting, the count logs are initialized or set to zero (Step 412). A detector "click" refers to receiving photons of interest by a particular detector.

Over an observation period, the number of photon detection events that occur at each of the four photon detectors is counted. (Step 413). The observation period for counting may be on the order of millisecond, e.g., 1-1,000 ms. With each click, the count log is incremented by 1. For different values of $\delta$, the values of the count logs Nij should change. After the observation period is over, the four counts logs at the two telescope sites are tallied.

The quantities which are calculated based on the count logs for the four coincidence detectors are the correlated clicks, the anti-correlated clicks and the total number of clicks. (Step 414). Going by the log of click times, if the upper two detectors or the lower two detectors at the left and right telescope sites have clicked at substantially the same time (i.e., $N_{L1}=N_{R1}$ or $N_{L2}=N_{R2}$ within a very small time window of each other (e.g., B/c, where B is the separation between the telescopes and c is the speed of light) then it is counted as one increment of the number of correlated clicks (Nc). If the upper detector at one site and the lower detector at the other site have clicked within that time window (i.e., $N_{L1}=N_{R2}$ or $N_{L2}=N_{R1}$ within the time window) then it is counted as one increment of the number of anti-correlated clicks (Nac). If both detectors at the same telescope site have clicked (i.e., $N_{L1}=N_{L2}$ or $N_{R1}=N_{R2}$ within the time window), then it is counted as one increment towards the total number of counts, but is neither correlated nor anti-correlated; these counts may be called (Ns). The formula to calculate the correlated probability is Pc=Nc/(Nc+Nac). The formula to calculate the anticorrelated probability is Pac=Nac/(Nc+Nac).

The quantum correlation E is calculated from the correlated clicks and the anti-correlated clicks at the telescope sites. (Step 415). Because of the mutually exclusive nature of the correlated counts, the anti-correlated counts, and those that are neither correlated nor anti-correlated, $E(\delta)$ can be expressed for the configuration in FIG. 3 as follows:

$$E(\delta)=(N_{11}+N_{22}-N_{12}-N_{21})/(N_{11}+N_{22}+N_{12}+N_{21}). \quad (3)$$

Figure 4C:
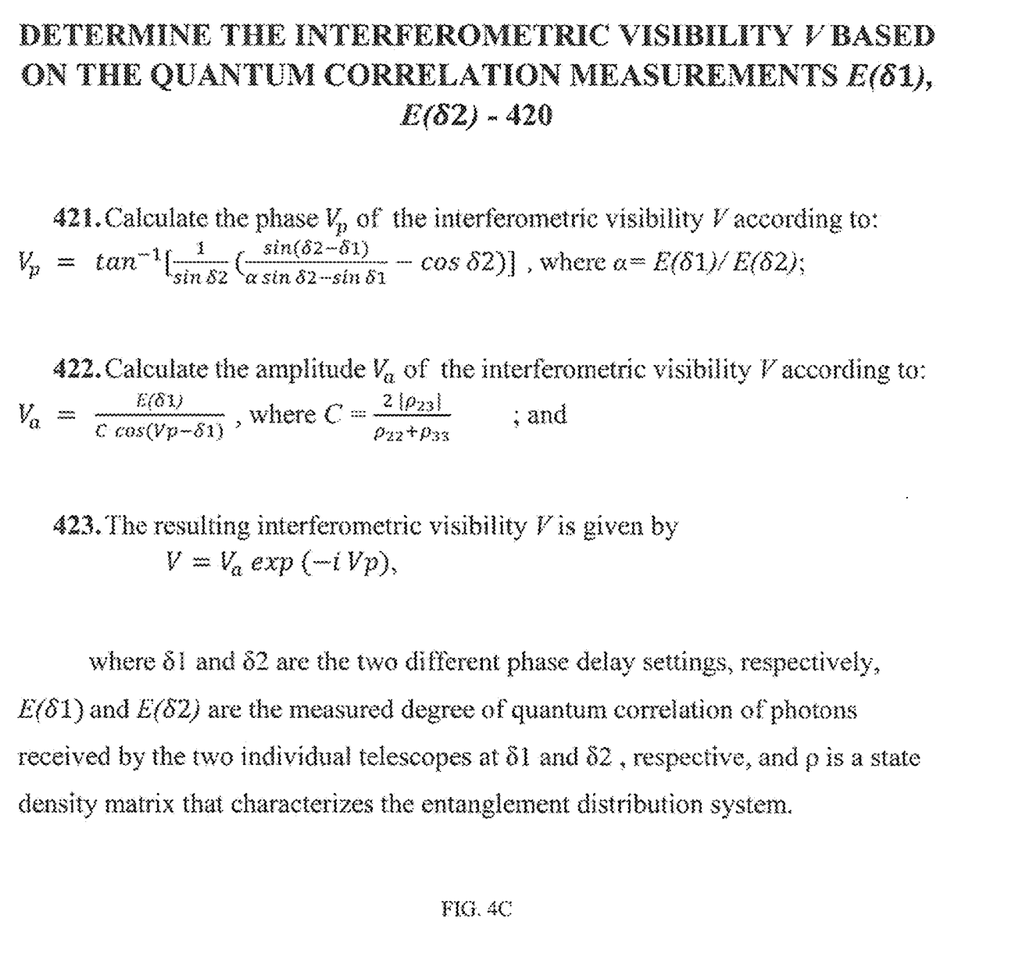
FIG. 4C shows a subroutine of the method for determining the interferometric visibility based on the quantum correlation measurements.

FIG. 4C shows the subroutine 420 for how to determine the interferometric visibility V based on the quantum correlation measurements $E(\delta 1)$ and $E(\delta 2)$ in greater detail according to embodiments of the present invention.

First, the phase $V_p$ of the interferometric visibility V is calculated. (Step 421). It is calculated according to:

$$V_p = \tan^{-1}\left[\frac{1}{\sin\delta 2}\left(\frac{\sin(\delta 2 - \delta 1)}{\alpha\sin\delta 2 - \sin\delta 1} - \cos\delta 2\right)\right], \text{ where } \alpha = E(\delta 1)/E(\delta 2). \quad (4)$$

Next, the amplitude $V_a$ of the interferometric visibility Vis calculated. (Step 422).

Its value is determined according to:

$$V_a = \frac{E(\delta 1)}{C\cos(Vp - \delta 1)}, \text{ where } C = \frac{2|\rho_{23}|}{\rho_{22} + \rho_{33}}. \quad (5)$$

From the above phase and amplitude calculations, the resulting interferometric visibility V is then determined (Step. 423). It is given by:

$$V = V_a \exp(-iVp). \quad (6)$$

The equations for the amplitude $V_a$ and phase $V_p$ of the interferometric visibility V were derived by the inventors in the aforementioned Quantum Physics paper, and the reader is invited to consult for further details. It has been verified mathematically.

The computations employed in subroutine 420 are largely mathematical. In the above equations, $\delta 1$ and $\delta 2$ are the two different phase delay settings, respectively, $E(\delta 1)$ and $E(\delta 2)$ are the measured degree of quantum correlation of photons received by the two individual telescopes at $\delta 1$ and $\delta 2$, respective, and rho ($\rho$) is a state density matrix that characterizes the entanglement distribution system. The state density matrix is further described below with respect to FIG. 5(a)-5(e).

More particularly, the state density matrix p describes the quantum state of an entangled photon distributed by the entanglement distribution system EDS once it reaches one of the two telescopes. It is a 4×4 matrix with sixteen entries. The entries of the matrix depend on the quantum state produced by the source and are modified by the noise in the fiber optic channels of the EDS. The state density matrix p can be experimentally determined by performing tomography experiments. The tomography procedure involves doing a set of linear optical experiments that reveal the matrix entries of the rho matrix. Quantum state tomography has been discussed in existing literature in the art. It is a standard procedure. For photonic qubits, which is of interest for this invention, a method described in Altepeter, J. B., Jeffrey, E. R., & Kwiat, P. G., "Photonic State Tomography," *Advances in Atomic, Molecular and Optical Physics*, Vol. 52, pp. 105-159 (2005), DOI: 10.1016/S1049-250X(05)52003-2, herein incorporated by reference in its entirety, may be employed. Section III of this paper describes collecting tomographic measurements which includes FIGS. 3, 4, and 5 and corresponding text which are of relevance for two-qubit tomography. And Section VII thereof gives an example of using tomography measurements to derive the state density matrix $\rho$.

Figure 5A:
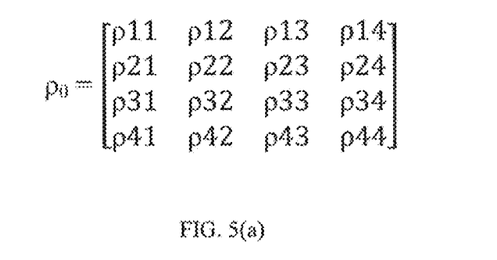
FIG. 5(a) shows the general form of the state density matrix used by embodiments of the present invention.

In the state density matrix, the first digit after the Greek letter rho $\rho$ corresponds to the row of the matrix (going from left to right) and the second digit corresponds to the column of the matrix (going from top to bottom) in conventional matrix nomenclature. FIG. 5(a) shows the general form of the matrix $\rho_0$. Entries in the state density matrix $\rho$ can be obtained before the start of the observations one is interested in. The measurements required to determine $\rho$ are performed and the sixteen entries in the matrix $\rho$ are calculated. This matrix may then be assumed to be constant for one fixed setting of the phase delay. The $\rho 23$ entry of the matrix changes when the phase delay is set to different values, but it changes in a direct way so that we do not have to recalculate the other matrix entries. The aforementioned Altepeter et al. paper shows one particular system designed for tomography measurements in its FIG. 3. For the tomography measurement necessary to determine the matrix p, one can use the same or a similar tomography measurement apparatus to the one from the Altepeter et al. paper.

Figure 5B:
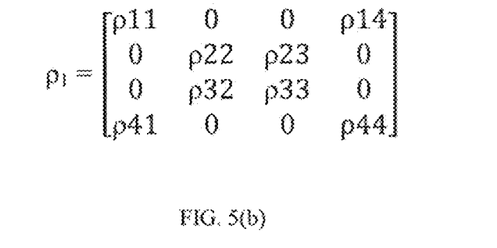
FIG. 5(b) shows a modified form of the matrix in FIG. 5(a) with zeros substituted for certain values.

Certain matrix entry values of the state density matrix are assumed to be zero due to the special set of entangled states assumed to be produced by the entanglement distribution system. These include the eight values at $\rho 12$, $\rho 13$, $\rho 21$, $\rho 24$, $\rho 31$, $\rho 34$, $\rho 42$ and $\rho 43$. FIG. 5(b) shows a modified form of the matrix $\rho i$, with the zero values substituted.

Figure 5C:
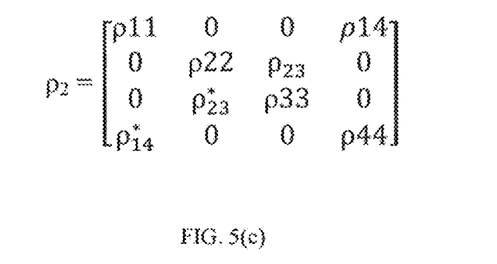
FIG. 5(c) shows a modified form of the matrix in FIG. 5(b) with certain complex conjugate substitutions made.

For the novel methods used in embodiments of the present invention, four values from the matrix $\rho$ are primarily used: $\rho 22$, $\rho 23$, $\rho 33$ and $\rho 32$. Due to the properties of the density matrix, $\rho 23$ and $\rho 32$ are complex conjugates of each other, and, as it also happens to be, $\rho 14$ and $\rho 41$ are complex conjugated of each other too. Thus, $\rho_{32} = \rho_{23}^*$ and $\rho_{23}^*$ can be substituted for the $\rho 32$ entry. And $\rho 41 = \rho_{14}^*$ so that $\rho_{14}^*$ can be substituted for the $\rho 41$ entry. In keeping with conventional matrix nomenclature, the asterisks * in superscript font represent a complex conjugate. FIG. 5(c) shows a modified form of the matrix $\rho_2$, with the complex conjugate substitutions made. This further simplifies the matrix.

For the visibility amplitude $V_a$, one only needs three matrix entries: $\rho 22$, $\rho 23$ and $\rho 33$. While $\rho 22$ and $\rho 33$ are real and positive numbers less than 1, $\rho 23$ is complex with absolute value less than 1. The term C is given by $C = 2*$Absolute value of $\rho 23$ divided by the sum of $\rho 22$ and $\rho 33$. The entries $\rho 22$ and $\rho 33$ can be interpreted physically as the populations of the quantum system in those states. The phase of the complex number $\rho 23$ appears in the numerator of the expression for $V_a$. For the calculation of the visibility amplitude $V_a$, the modified form of the matrix $\rho 2$, can be used for p. At the start of the experiment, one would perform tomography and determine $\rho 23$. As previously mentioned, the measured value of $\rho 23$ will come out to be a complex number. The phase of the complex number $\rho 23$ will be correspond to the phase delay $\delta$. When the phase is changed from M to $\delta 2$ (or any other value), the phase of the complex number $\rho 23$ is going to change such that $\rho_{23} = |\rho_{23}|e^{-i\delta}$. One can either measure $\rho 23$ again or assume that the phase set is the new phase of the new complex number $\rho 23$ by the aforementioned equation. In practice, one generally determines the matrix entries of $\rho$ as outlined above and performs calculations algorithmically without much thought to the physical interpretation.

Losses and imperfections will result in different values of $\rho 22$, $\rho 33$ and $\rho 23$ in the state density matrix $\rho$. The quantum state of the photonic pair is assumed characterized prior to the main measurement in a special process known as state tomography.

Figure 5D:
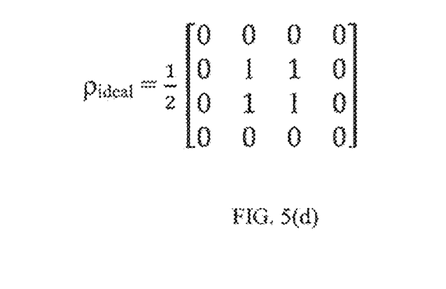
FIG. 5(d) shows the state density matrix for an ideal, perfectly entangled state between the two individual telescopes.

It is noted that for an ideal, perfectly entangled state between the two individual telescopes the state density matrix $\rho$ would take the simple form of the density matrix $\rho_{ideal}$ for the ideal case that consists of zeros and ones. This is shown in FIG. 5(d). But, as noted above, assuming a perfectly entangled state between the telescopes is inaccurate and thus problematic. The ensemble of single astronomical photons from an extended source is a probabilistic mixture of pure states, each with its own independent phase.

Figure 5E:
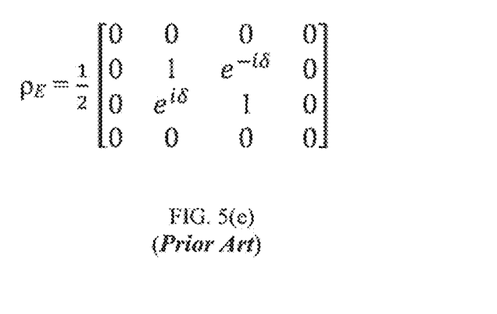
FIG. 5(e) shows the state density matrix assumed by Gottesman et al. for a pure mode-entangled Bell state.

Gottesman et al. assumed that the shared entangled state between the telescopes is a pure mode-entangled Bell state with the state density matrix $\rho_E$ shown in FIG. 5(e). While this matrix $\rho_E$ takes into account phase $\delta$, it is essentially the same in magnitude as the ideal density matrix $\rho_{ideal}$.

Perfectly entangled states as a resource state are not possible because of noise in the connecting fiber optic channels from the source to the telescope sites. More particular, the technology required to reliably distribute perfectly entangled quantum states such as high-throughput repeaters, long-lifetime quantum memories, decoherence-free entanglement swapping mechanisms, high-fidelity quantum gates for purification, distillation and error-correcting protocols is not mature enough to yield distributed states with fidelities close to perfectly-entangled Bell-states. The photons can be lost or delayed or their phases modified resulting in imperfectly entangled states.

The novel methodology according to embodiments may be executed by a suitable controller 50. It may be configured to execute ordinary machine-executable instructions 51 to control and operate the entangled photon distribution system for the telescopes in a conventional manner. For instance, the Navy Prototype Optical Interferometer at The Lowell Observatory near Flagstaff, Ark., executes ordinary control instructions for conventionally implementing interferometric telescopy. Not only for ordinary control, but the controller may be further configured to execute machine-executable instructions 52 to implement the novel methodology for determining interferometric visibility of signals received from a telescope system aided by quantum entanglement according to embodiments of the present invention. The novel methodology takes into account imperfect quantum entanglement between the telescopes. The controller 50 may be implemented as hardware, software or a combination thereof specifically configured to execute code or instructions necessary to implement embodiments of the present invention. Machine-executable instructions (such as software or machine code) can be stored in a memory device (not shown) and will be executed by the controller as needed. In some implementations, software code (instructions), firmware, or the like, may be stored on a computer or machine-readable storage media. The controller may be comprised of one or more processor devices.

The machine-executable instructions may be part of the controller, although, it will be appreciated they could be executed by one or more distinct processors thereof or, in other implementations, by processors of distinct and separate controllers altogether. The processor(s) may be a programmable processor, such as, for example, a field-programmable gate array (FPGA) or an application-specific integrated circuit (ASIC) processor. The methodology disclosed herein may be implemented and executed by an application created using any number of programming routines. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

The novel methodology of the present invention is believed to work with all conventional optical telescopes. They can be conventional optical designs, e.g., refractor, reflector, or catadioptric. There are no size requirements on the telescope apertures. Typically apertures of diameter 1 m are standard. For instance, the star 'Vega' produces a photon flux of a few MHz for a telescope of diameter 1 m. The observation time is determined by the atmospheric fluctuation time. This is the time scale for which conditions that determine optical properties, such as air density over the distance range of the two telescopes are constant. Typically, this time is of the order of milliseconds (e.g., 1-1,000 ms) for telescopes separated by a few hundred meters.

The novel methodology works for all parts of the optical spectra (IR, visible, UV) but may be most effective for the visible and near-visible part of the spectrum. It may also be beneficial for applications that require high resolution imaging especially in low light condition and include sensing, communication, and imaging. Three large interferometric telescopy stations are in the United States at Mount Wilson, Calif., Magdalena Ridge, N. Mex. and Anderson Mesa, Ark. These stations are all prime candidates for implementation the novel methodology of the embodiments of the present invention. The methodology, if implemented, can allow telescopes to be placed arbitrarily far apart if a sufficiently good (high entanglement generation rate and low decoherence due to noise) entanglement distribution system is available.

These capabilities when applied, for instance, to interferometric telescopy could produce three orders of magnitude increase in resolution, for instance by connecting Mount Wilson, Calif. optical interferometer with the Navy Precision Optical Interferometer at Anderson Mesa, N. Mex. Both facilities are building 300-400 m interferometers. Connecting them together will produce an interferometer with about 1000 km base. This could increase resolution three orders of magnitude. These facilities track and characterize satellites in GEO and LEO orbits, and produces space imagery and astrometry. The latter is a major component required for the safe position, navigation, and orienting of the world's orbiting satellites through upwards of more than 19,000 pieces of orbiting space debris.

While only two telescopes are shown in FIG. 3, it will be appreciated that the novel methodology can be extended to three or more telescopes.

Generating an Image of a Target Using the Determined Interferometric Visibility.

Once the interferometric visibility V is determined in step 420 of method 400, it may be used for generating images of an object, such as an astronomical target. An image of a distant source is defined as the intensity distribution of the source as a function of the observation angle at a fixed frequency. To obtain this intensity distribution one has to integrate the visibility function V over separation B between telescopes and observation angles θ at which the telescopes were set. Eq. (9), below, expresses this method mathematically because the integration is over all possible telescope-separations and observation angles.

The complex visibility function $V_\upsilon(r_1, r_2)$ is defined as the spatial autocorrelation function of the electromagnetic radiation E collected by telescopes at two different locations $r_1$ and $r_2$ $$V_\upsilon(r_1,r_2):=\langle \bar{E}_\upsilon(r_1)\bar{E}_\upsilon^*(r_2)\rangle \quad (7)$$

where the raised asterisk denotes complex conjugation and subscript υ refers to the specific frequency for which the correlation is measured. Note, because $\bar{E}_\upsilon(r_1)$ and $\bar{E}_\upsilon(r_2)$ are 3D-vectors, Eq. (7) yields a tensor. For simplicity, here we consider the electromagnetic field produced by the celestial sources to be a scalar. Thus, we model the scalar field ε(R) produced at a distant point R in the sky propagating to the telescope at the observation point r via the propagator, $P(R, r)=e^{2\pi i|R-r|}/|R-r|$, under the standard assumption of the space between the source and telescope being empty. The total field is given by adding up contributions from all sky regions on the celestial sphere with radius |R| which implies that at the point $r_i$, the total field is $\int \varepsilon(R)e^{2\pi i|R-r|}/|R-r|d\zeta$ with dζ an element of solid angle subtended by the source at the point $r_i$. Under two other standard astronomical assumptions: a) the celestial sources are spatially incoherent, $\langle\varepsilon(R_1)\varepsilon(R_2)\rangle=0$, and b) far-field sources, $|R_{1,2}|\gg|r_{1,2}|$, Eq. (2) takes the form:

$$V_\upsilon(r_1,r_2) = \int I_\upsilon(\hat{s})e^{-2\pi i\upsilon\hat{s}\cdot(r_1-r_2)/c}d\Omega, \quad (8)$$

where $I_\upsilon(\hat{s})$ is the intensity distribution as a function of the observation direction vector $\hat{s}$, $d\Omega$ is an element of solid angle, and integration is done over the entire solid angle subtended by the source. Eq. (8) expresses the visibility function $V_\upsilon(r_1, r_2)$ as the Fourier transform of the source intensity distribution $I_\upsilon(\hat{s})$, at observation frequency $\upsilon$. Note that $I_\upsilon(\hat{s})$ is a function of the observation angle, given by the unit direction vector $\hat{s}$ relative to the fixed coordinate system at the telescopes. This is the essential content of the Van Cittert-Zernike theorem: access to visibility at various baselines allows for complete reconstruction of the source intensity distribution. However, the range of the baseline-size is limited in experimental measurements, therefore using the inverse Fourier transform of Eq. (8) we have, $$I_\upsilon(\hat{s}) = \int_0^{B_m} V_\upsilon(r_1, r_2)e^{2\pi i\upsilon\hat{s}\cdot r}/c\, dr, \quad (9)$$

where $r = r_2 - r_1$, $B_m$ is the maximum baseline size. The relation in Eq. (8) implies that the angular-resolution of the interferometric array of telescopes can be improved by increasing the value of $B_m$.

Since direct-detection interferometric measurements require light to be physically brought from the telescopes to the central detection station, where the correlation function in the R.H.S. of Eq. (7) is measured, the photon loss in optical channels limits the increase of the baseline size. In addition to photon losses, atmospheric density fluctuations and various physical mechanisms of noise also hinder the visibility measurements, reducing sensitivity and resolution of the direct-detection method. In this disclosure, however, it only discusses how quantum-enhanced interferometry can mitigate the problem of photon-loss.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

We claim:

1. A method for determining interferometric visibility of signals received from a telescope system aided by quantum entanglement having:
    a pair of telescopes spaced apart;
    a first beamsplitter connected to the first of the pair of telescopes which splits light to a first pair of photon detectors;
    a second beamsplitter connected to the second of the pair of telescopes which splits light to a second pair of photon detectors;
    an entanglement distribution system connected to the first and second beamsplitters which generates entangled photons and transmits respective ones of the entangled photons to each of the first and second beamsplitters; and
    a phase modulator connected to the entanglement distribution system which is configured to set the phase delay for light transmitted between the first and second beamsplitters via the entanglement distribution system, wherein the quantum entanglement between the telescopes is imperfect,
    the method comprising:
    for two different phase delay settings for entangled photons received by the individual telescopes of the pair, measuring the degree of quantum correlation between the telescopes; and
    determining the interferometric visibility based on the quantum correlation measurements for the two different phase delay settings.

2. The method of claim 1, wherein the two different phase delay settings are selected such that a difference D between them is $0 < D < \pi$ radians.

3. The method of claim 1, wherein measuring the degree of quantum correlation between the telescopes, comprises:
    maintaining count logs for each of the four photon detectors of the first pair and second pair of photon detectors;
    initializing the count logs;
    over an observation period, counting the number of photon detection events that occur at each of the four photon detectors; and
    determining correlated counts, anti-correlated counts, and those of which are neither correlated nor anti-correlated for the two individual telescopes;
    calculating the degree of quantum correlation of photons received by the two individual telescopes from the determined counts.

4. The method of claim 3, wherein the observation period is about 1-1,000 ms.

5. The method of claim 3, wherein the degree of quantum correlation E is calculated according to:
$E = (N_{11} + N_{22} - N_{12} - N_{21})/(N_{11} + N_{22} + N_{12} + N_{21})$, where Nij is count log for a given photon detector ij.

6. The method of claim 1, wherein the interferometric visibility V is given according to:
$V = V_a \exp(-iVp)$, where $V_a$ is the amplitude and $V_p$ is the phase thereof.

7. The method of claim 6, wherein determining the interferometric visibility based on the quantum correlation measurements for the two different phase delay settings comprises:
    calculating the phase $V_p$ of the interferometric visibility V according to:

$$V_p = \tan^{-1}\left[\frac{1}{\sin\delta 2}\left(\frac{\sin(\delta 2 - \delta 1)}{\alpha\sin\delta 2 - \sin\delta 1} - \cos\delta 2\right)\right],$$

where $\alpha = E(\delta 1)/E(\delta 2)$; and
    calculating the amplitude $V_a$ of the interferometric visibility V according to:

$$V_a = \frac{E(\delta 1)}{C\cos(Vp - \delta 1)}, \text{ where } C = \frac{2|\rho_{23}|}{\rho_{22} + \rho_{33}},$$

wherein $\delta 1$ and $\delta 2$ are the two different phase delay settings, respectively, $E(\delta 1)$ and $E(\delta 2)$ are the measured degree of quantum correlation of photons received by the two individual telescopes at $\delta 1$ and $\delta 2$, respective, and $\rho$ is a state density matrix that characterizes the entanglement distribution system according to:

$$\rho = \begin{bmatrix} \rho 11 & 0 & 0 & \rho 14 \\ 0 & \rho 22 & \rho 23 & 0 \\ 0 & \rho_{23}^* & \rho 33 & 0 \\ \rho_{14}^* & 0 & 0 & \rho 44 \end{bmatrix}.$$

8. The method of claim 7, further comprising:
determining values in the state density matrix ρ by performing tomography experiment procedures on the telescope system.

9. The method of claim 1, further comprising:
creating an image of a target by interfering light that each telescope individually captures aided by the quantum entanglement and the determined interferometric visibility by integrating the determined interferometric visibility.

10. A telescope system comprising:
a pair of telescopes spaced apart;
a first beamsplitter connected to the first of the pair of telescopes which splits light to a first pair of photon detectors;
a second beamsplitter connected to the second of the pair of telescopes which splits light to a second pair of photon detectors;
an entanglement distribution system connected to the first and second beamsplitters which generates entangled photons and transmits respective ones of the entangled photons to each of the first and second beamsplitters;
a phase modulator connected to the entanglement distribution system which is configured to set the phase delay for light transmitted between the first and second beamsplitters via the entanglement distribution system, wherein the quantum entanglement between the telescopes is imperfect; and
a controller configured to:
for two different phase delay settings for entangled photons received by the individual telescopes of the pair, measure the degree of quantum correlation between the telescopes; and
determine the interferometric visibility based on the quantum correlation measurements for the two different phase delay settings.

11. The telescope system of claim 10, wherein the each of the pair of telescopes have a diameter of 1 m or greater.

12. The telescope system of claim 10, wherein the entanglement distribution system comprises: a single photon source, a beam splitter, a frequency conversion device, source-fiber optical couplers, optical fibers, and quantum memories.

13. The telescope system of claim 10, wherein the phase delay setting level is set by adjusting the phase modulator.

14. The telescope system of claim 10, wherein the telescopes are spaced about 300-400 m apart.

15. The telescope system of claim 10, wherein the telescopes are spaced about 1,000 km or more apart.

16. A controller for use with a telescope system aided by quantum entanglement having a pair of telescopes spaced apart; a first beamsplitter connected to the first of the pair of telescopes which splits light to a first pair of photon detectors; a second beamsplitter connected to the second of the pair of telescopes which splits light to a second pair of photon detectors; an entanglement distribution system connected to the first and second beamsplitters which generates entangled photons and transmits respective ones of the entangled photons to each of the first and second beamsplitters; a phase modulator connected to the entanglement distribution system which is configured to set the phase delay for light transmitted between the first and second beamsplitters via the entanglement distribution system, wherein the quantum entanglement between the telescopes is imperfect,
the controller configured to execute machine-executable instructions enabling the controller to implement a method comprising:
for two different phase delay settings for entangled photons received by the individual telescopes of the pair, measuring the degree of quantum correlation between the telescopes; and
determining the interferometric visibility based on the quantum correlation measurements for the two different phase delay settings.

* * * * *